US008594464B2

(12) United States Patent
Liu

(10) Patent No.: US 8,594,464 B2
(45) Date of Patent: Nov. 26, 2013

(54) ADAPTIVE SUPER RESOLUTION FOR VIDEO ENHANCEMENT

(75) Inventor: Ce Liu, Arlington, MA (US)

(73) Assignee: Microsoft Corporation, Redmond, WA (US)

(*) Notice: Subject to any disclaimer, the term of this patent is extended or adjusted under 35 U.S.C. 154(b) by 264 days.

(21) Appl. No.: 13/117,017

(22) Filed: May 26, 2011

(65) Prior Publication Data

US 2012/0300122 A1 Nov. 29, 2012

(51) Int. Cl.
*G06K 9/32* (2006.01)
(52) U.S. Cl.
USPC ............ 382/299; 382/294; 382/255; 382/107
(58) Field of Classification Search
USPC .................................. 382/294, 299, 255, 107
See application file for complete search history.

(56) References Cited

U.S. PATENT DOCUMENTS

| | | | | |
|---|---|---|---|---|
| 5,696,848 | A * | 12/1997 | Patti et al. ...................... | 382/254 |
| 7,085,323 | B2 * | 8/2006 | Hong ....................... | 375/240.25 |
| 7,106,914 | B2 | 9/2006 | Tipping | |
| 7,477,802 | B2 * | 1/2009 | Milanfar et al. .............. | 382/299 |
| 7,702,184 | B2 | 4/2010 | Aiso | |
| 7,809,155 | B2 | 10/2010 | Nestares | |
| 8,374,464 | B2 * | 2/2013 | Toda .............................. | 382/299 |
| 2007/0092143 | A1 | 4/2007 | Higgins | |
| 2007/0177817 | A1 * | 8/2007 | Szeliski et al. ................. | 382/275 |
| 2007/0242900 | A1 * | 10/2007 | Chen et al. ..................... | 382/294 |
| 2009/0232213 | A1 | 9/2009 | Jia | |

OTHER PUBLICATIONS

Improving resolution—Registration, Irani et al., CVGIP, 1991, pp. 231-239.*
Recursive reconstruction—Multiframes, Kim et al., IEEE, 0096-3518,1990, pp. 1013-1027.*
Parameter estimation—multisensors, Molina et al., IEEE, 1057-7149, 2003, pp. 1655-1667.*
Bayesian image super resolutipon, Tipping et al., MIT press, 2003, pp. 1-8.*
Locally Adaptive Regularized Super-Resolution on Video with Arbitrary Motion—Published Date: Sep 29, 2010; http://wwvv.cic.unb.br/~mylene/PI_2010_2/ICIP10/pdfs/0000897.pdf.
Correction of Spatially Varying Image and Video Motion Blur Using a Hybrid Camera—Published Date: Jun. 2010; http://research.microsoft.com/en-us/UM/people/stevelin/papers/pami10.pdf.
Bayesian Image Super-Resolution—Published Date: Jun. 26, 2006; http://www.miketipping.com/papers/met-superbayes.pdf.

(Continued)

*Primary Examiner* — Jayesh A Patel

(57) ABSTRACT

A method of operating a computer system to reconstruct a high-resolution frame from a set of low-resolution frames of a video sequence is described. The high-resolution frame may be displayed on a high-resolution display device such as a high-definition television (HDTV). Initial estimates and priors for each of a plurality of quantities including blur kernel, motion between frames, noise level, and the estimate of the high-resolution frame are determined. The initial estimates are refined using an iterative process that iterates between estimating each of the plurality of quantities based on the current estimates for the plurality of quantities. When it is determined that a quality metric is above a threshold, further iteration is halted and the high-resolution frame is output for storage and/or display. The process may be repeated for outputting a high-resolution video sequence based on an input low-resolution video sequence.

20 Claims, 8 Drawing Sheets

(56) References Cited

OTHER PUBLICATIONS

A Bayesian Approach to Image Expansion for Improved Definition—Published Date: May 1994; http://ieeexplore.ieee.org/stamp/stamp.jsp?tp=&arnumber=287017.

Super-resolution Optical Flow; Publication Date: 1999 http://citeseerx.ist.psu.edu/viewdoc/download;jsessionid=F273F349A828BD6EC79819C74C1A6091?doi=10.1.1.72.6764&rep=rep1&type=pd.

Limits on Super-resolution and How to Break them; Publication Date: 1999 http://www.ri.cmu.edu/pub_files/pub2/baker_simon_2000_2/baker_simon_2000_2.pdf.

Motion Deblurring and Super-resolution from an Image Sequence; Publication Date: 1996 http://citeseerx.ist.psu.edu/viewdoc/download;jsessionid=18558CBEB435912724CFF1F1599A8082?doi=10.1.1.19.7969&rep=rep1&type=pdf.

High Accuracy Optical Flow Estimation based on a Theory for Warping; Published Date: May 2004; http://citeseerx.ist.psu.edu/viewdoc/download?doi=10.1.1.4.1732&rep=rep1&type=pdf.

Optical Flow Based Super-resolution: A Probabilistic Approach; Publication Date: 2007 http://cvlab.epfl.ch/~strecha/publications/cviu2007.pdf.

Digital Image Processing; Publication Date: 2001; http://www.ciesin.org/docs/005-477/005-477.html.

Joint MAP Registration and High-resolution Image Estimation using a Sequence of Undersampled Images; Publication Date: Dec. 1997 http://citeseerx.ist.psu.edu/viewdoc/download?doi=10.1.1.130.243&rep=rep1&type=pdf.

Determining Optical Flow; Publication Date: Aug. 1981 http://citeseerx.ist.psu.edu/viewdoc/download?doi=10.1.1.93.3092&rep=rep1&type=pdf.

Improving Resolution by Image Registration; Publication Date: 1991; http://www.wisdom.weizmann.ac.il/~irani/PAPERS/SR_CVGIP91.pdf.

PSF Estimation using Sharp Edge Prediction; Publication Date: 2008; http://ieeexplore.ieee.org/stamp/stamp.jsp?tp=&arnumber=4587834.

Blind Image deconvolution: Publication Date: 1996; http://www1.cs.columbia.edu/~belhumeur/courses/compPhoto/blinddeconvolution.pdf.

Image and Depth from a Conventional Camera with a Coded Aperture; Publication Date: 2007; http://groups.csail.mit.edu/graphics/CodedAperture/CodedAperture-LevinEtAl-SIGGRAPH07.pdf.

Understanding and Evaluating Blind Deconvolution Algorithms; Publication Date: 2009; http://dspace.mit.edu/bitstream/handle/1721.1/44964/MIT-CSAIL-TR-2009-014.pdf?sequence=1.

Fundamental Limits of Reconstruction based Superresolution Algorithms under Local Translation; Publication Date: 2004; http://research.microsoft.com/pubs/69073/2004-TPAMI-SR.pdf.

Beyond Pixels: Exploring New Representations and Applications for Motion Analysis; Publication Date: 2009; http://dspace.mit.edu/bitstream/handle/1721.1/53293/549097790.pdf?sequence=1.

A High-quality Video Denoising Algorithm based on Reliable Motion Estimation; Publication Date: 2010; http://people.csail.mit.edu/celiu/pdfs/videoDenoising.pdf.

Automatic Estimation and Removal of Noise from a Single Image; Publication Date: 2008; http://citeseerx.ist.psu.edu/viewdoc/download?doi=10.1.1.143.6751&rep=rep1&type=pdf.

Blind Restoration/Superresolution with Generalized Cross-validation using Gauss-type Quadrature Rules; Publication Date: 1999; http://www.cse.ucsc.edu/~milanfar/publications/conf/asilomar99.pdf.

Super-resolution Image Reconstruction: A Technical Overview; Publication Date: 2003; http://cs.utsa.edu/~qitian/seminar/Fall04/super-resolution/survey_2003.pdf.

Extraction of High-resolution Frames from Video Sequences; Publication Date: Jun. 1996; http://ieeexplore.ieee.org/stamp/stamp.jsp?tp=&arnumber=503915.

Fast Image/Video Upsampling; Publication Date: 2008; http://citeseerx.ist.psu.edu/viewdoc/download?doi=10.1.1.141.1747&rep=rep1&type=pdf.

Simultaneous Superresolution and Blind Deconvolution; Publication Date: 2008; http://library.utia.cas.cz/separaty/2008/ZOI/sroubek-flusser-simultaneous%20super-resolution%20and%20blind%20deconvolution.pdf.

Superresolution without Explicit Subpixel Motion Estimation; Publication Date: Sep. 2009; http://ieeexplore.ieee.org/stamp/stamp.jsp?tp=&arnumber=4967983.

Motion Deblurring and Super-resolution from an Image Sequence ; Publication Date: 1996; http://citeseerx.ist.psu.edu/viewdoc/download;jsessionid=FA037C35778214600C3A43701277FE7D?doi=10.1.1.19.7969&rep=rep1&type=pdf.

\* cited by examiner

ADAPTIVE SUPER RESOLUTION FOR VIDEO ENHANCEMENT

BACKGROUND

Low-end imaging devices such as web-cams and mobile phones often record low-resolution images or videos. With the recent proliferation of high-resolution displays such as high-definition televisions (HDTVs), users often want to display video recorded on a low-end imaging device on displays that have a higher resolution. Reconstructing high-resolution frames from a sequence of low-resolution frames in a video sequence may be accomplished using techniques generally classified as multi-frame super resolution. In a simple example of super resolution, multiple low-resolution frames may represent the same scene with the only difference between the frames being small linear movements or translations between the pixels in adjacent frames. Super resolution infers a high-resolution frame through the realization that small pixel shifts between frames result in a sequence of low-resolution frames with slightly different sample values. Taking into account the different sample values in a set of low-resolution frames enables the extraction of higher-frequency details of the scene resulting in a super-resolved high-resolution frame.

The process of accurately restoring a high resolution frame from a sequence of low-resolution frames becomes more complex when the imaged scene in the input sequence of low-resolution frames changes, as is often the case with recorded video sequences. Furthermore, factors related to the recording process itself may contribute to image degradation, and failure to take these factors into consideration when super-resolving a set of low-resolution images may yield results that are blurry, aliased, or otherwise distorted. For example, the recording lens and/or the atmospheric environment between the recording device and an imaged object may introduce blur into a recorded image and quantization imposed by the sensor array in the recording device may introduce noise into the recorded image. Other sources of degradation from the recording process may include distortion and aliasing effects.

Initially, super-resolution work focused primarily on dealing with the ill-posed nature of reconstructing a high-resolution frame from a sequence of low-resolution frames. Most approaches addressed the lack of constraints in this ill-posed problem by making strict assumptions about the input video sequence including assumptions related to the image degradation factors described above and/or constraints on reconstructing the high-resolution frame. For example, some approaches have employed spatial priors when reconstructing the high-resolution frame. Other approaches have jointly estimated the translational pixel motion and the high-resolution frame and/or considered motion blur using a simple affine motion model. To better approximate the complex motion of faces, some super resolution techniques used more complex motion models designed to capture additional motion details.

SUMMARY

The inventor has recognized that conventional super resolution techniques, which often make strong assumptions about the nature of the input video sequence, are not adaptive to varying imaging conditions which are typically encountered when video is captured using low-end imaging devices such as a mobile phone. For example, super resolution techniques often assume that the underlying motion between frames has a simple parametric form and/or that the blur kernel and noise levels are known. However, in reality, the motion of objects and the imaging device may be arbitrary, the recorded video may be contaminated with noise of an unknown level, and motion blur and point spread functions can lead to an unknown blur kernel.

By assuming some image degradation quantities such as noise level and blur kernel are known, conventional super resolution techniques produce results that fail to fully consider the different environmental and technological video recording conditions that exist in practice. Accordingly, some embodiments of the invention are directed to super resolution methods and apparatus capable of reconstructing a high-resolution frame from a sequence of low-resolution frames within a probabilistic framework by modeling and estimating the unknown image degradation quantities about the input video sequence. In some embodiments this may be accomplished by iteratively estimating motion (e.g., flow fields between frames), noise level, and blur kernel in addition to reconstructing a high-resolution frame from a set of low-resolution frames.

Some embodiments are directed to a Bayesian framework for adaptive video super resolution that incorporates high-resolution frame reconstruction, motion estimation, noise level estimation, and blur kernel estimation. The super resolution computation may be reduced to an optimization problem for each quantity when other factors are known by using sparse priors during estimation of the high-resolution frame, flow fields, and blur kernel. Because the inference algorithm may be ill-posed, sparse priors may be used to recover the unknown quantities in the optimization problem. An iterative process that iterates between motion estimation, noise estimation, blur estimation, and high-resolution frame reconstruction is described. Although modeling sparse priors for the unknown quantities results in an inference algorithm that may be computationally more intensive than conventional super resolution systems, the computational complexity may be offset by the ability of super-resolution processes described herein to adapt to practical imaging scenarios. The super resolution processes described herein produce superior results on challenging real-world sequences despite various noise levels and blur kernels, by accurately reconstructing both major structures and fine texture details.

Some other embodiments are directed to a method of generating a high-resolution frame from a plurality of adjacent low-resolution frames in a video sequence, the method comprising: generating, with at least one processor, initial estimates for a plurality of quantities including blur kernel, noise level, motion, and the high-resolution frame; refining the initial estimates for the plurality of quantities using an iterative process to generate refined estimates for the plurality of quantities including a refined estimate for the high-resolution frame; and outputting the refined estimate for the high-resolution frame when it is determined that an estimate of the refined estimates has a quality metric above a threshold.

Some other embodiments are directed to a computer-readable storage medium encoded with a plurality of instructions that, when executed by a computer, perform a method of generating a high-resolution frame from a plurality of low-resolution frames of a video sequence within a generative Bayesian framework. The method comprises generating initial estimates for a plurality of unknown quantities including blur kernel, noise level, motion, and the high-resolution frame; refining the initial estimates for the plurality of quantities to generate refined estimates by iteratively estimating each of the plurality of quantities within the Bayesian framework using coordinate descent; and outputting the refined estimate for the high-resolution image when it is determined that an estimate of the refined estimates has a quality metric above a threshold.

Some other embodiments are directed to a computer system, comprising at least one processor programmed to: generate initial estimates for a plurality of quantities associated with a sequence of low-resolution frames of a video sequence, wherein the plurality of quantities includes a blur kernel, a noise level, a motion estimate, and an estimate of a high-resolution frame; refine the initial estimates for the plurality of quantities using an iterative process to generate refined estimates for the plurality of quantities including a refined estimate for the high-resolution frame; and output the refined estimate for the high-resolution frame when it is determined that an estimate of the refined estimates has a quality metric above a threshold.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As described above, conventional super resolution techniques often assume that one or more quantities of a given a set of low-resolution images is known or can be approximated by a simple model. Additionally, some conventional super resolution techniques constrain the reconstruction of a high-resolution frame to simplify the calculations in the estimation. Although conventional super resolution techniques may be adequate for some video sequences recorded under ideal or near-ideal conditions, such techniques do not adapt well to the extensive range of video recording conditions encountered in practice.

Figure 1:
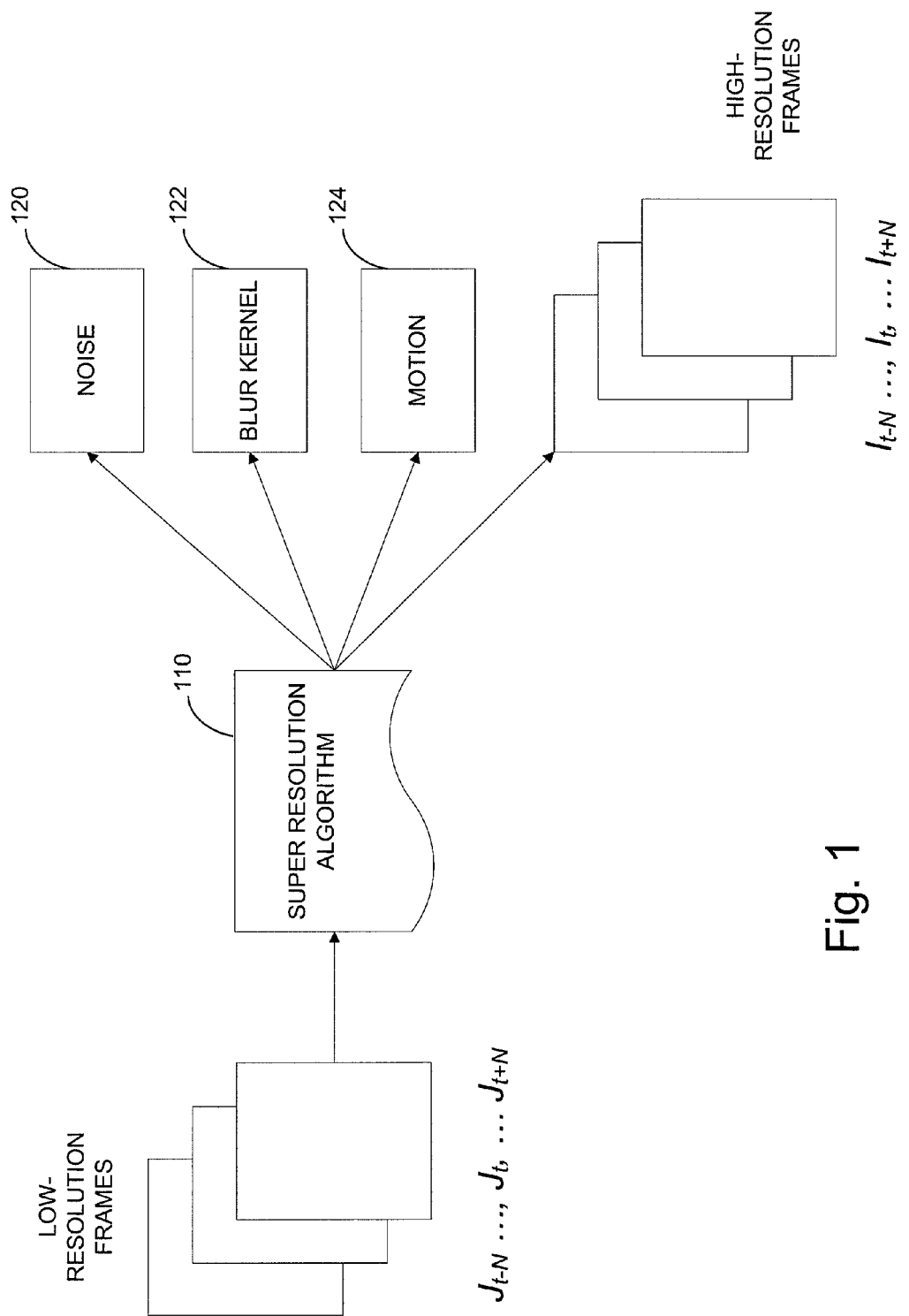
FIG. 1 is a diagram of a super resolution process in accordance with some embodiments of the invention.

Accordingly, some embodiments are directed to novel super resolution methods and apparatus for estimating a high-resolution sequence of frames $\{I_t\}$ given a low-resolution sequence of frames $\{J_t\}$. FIG. 1 schematically illustrates a super resolution process in accordance with some embodiments of the invention. As shown in FIG. 1, a super-resolution algorithm 110 receives as input a set of low-resolution frames $\{J_t\}$ and outputs estimates for noise level 120, blur kernel 122, and motion 124, in addition to reconstructing an estimate of the corresponding high-resolution sequence $\{I_t\}$. In some embodiments, each of the noise level 120, blur kernel 122, motion 124, and high-resolution sequence are treated as random variables in a generative framework, and these quantities are iteratively solved for without using at least some of the assumptions employed by many conventional super resolution systems. For this reason, some embodiments may adapt more readily to a variety of actual recording conditions than conventional super resolution systems.

The discussion below regarding the estimation of motion 124 uses an optical flow algorithm as an exemplary method for estimating motion between frames of an input set of low-resolution frames and often includes the terminology "optical flow" and/or "flow field" to describe calculating motion between frames. However, it should be appreciated that any suitable motion estimation algorithm may be used with embodiments of the invention and the optical flow algorithm described herein is only one possible solution.

In some embodiments, the high-resolution sequence $\{I_t\}$ is estimated using adjacent low-resolution frames $\{J_{t-N}, \ldots, J_{t-1}, J_t, J_{t+1}, \ldots, J_{t+N}\}$ to simplify the calculations. However, it should be appreciated that any suitable set of low-resolution frames may be used for super resolution and embodiments of the invention are not limited to using adjacent low-resolution frames. For brevity, the variable t will be removed from the variables in the discussion below. Accordingly, some embodiments of the invention are directed to estimating a high-resolution frame I given a series of lower resolution frames $\{J_{-N}, \ldots, J_N\}$. Additionally, the equations described below refer to processing a set of gray-scale frames for mathematical succinctness. However, it should be appreciated that embodiments of the invention are not limited to processing gray-scale frames and super resolution techniques described in more detail below may be extended for processing color frames as well. For example, each pixel in a color frame may be associated with a plurality of values representing the color components in a particular color model (e.g., RGB, CMYK). Accordingly, rather than processing a single grayscale value for each pixel, some embodiments of super resolution may include multiple dimensions for processing each color component value associated with pixels in a color frame.

Figure 2:
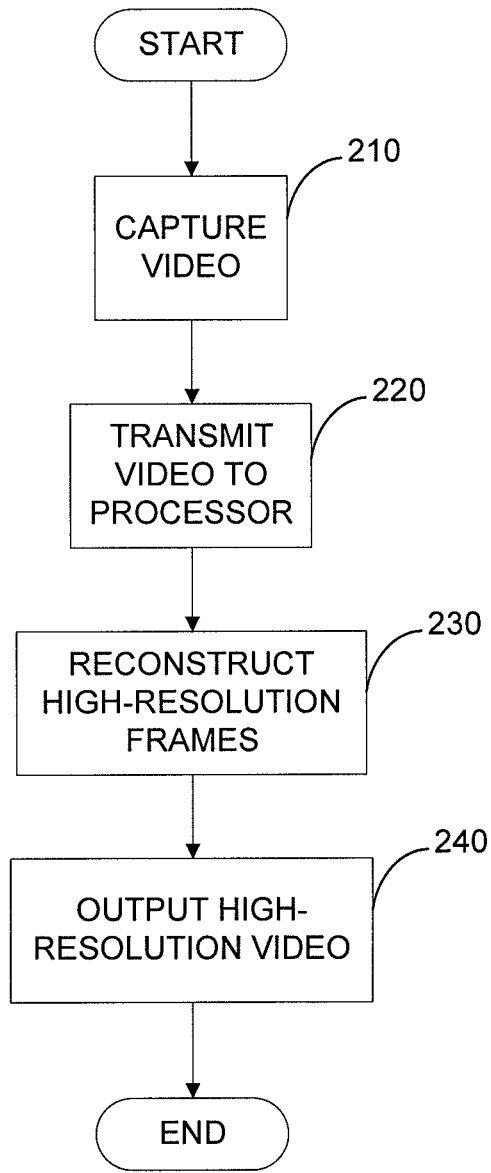
FIG. 2 is a flow chart of a process for providing high-resolution video in accordance with some embodiments of the invention.

An exemplary process for reconstructing a high-resolution frame from a plurality of low-resolution frames in accordance with some embodiments of the invention is illustrated in FIG. 2. In act 210, video is captured using any suitable video recording device. For example, video may be captured on a mobile phone, a smartphone, a laptop computer, a camcorder, a webcam, or any other video recording device. After capturing the video in act 210, the process proceeds to act 220, where the video is transmitted to at least one processor for super resolution processing described in more detail below. In some embodiments, the processor may be included as a portion of the video recording device that captured the video, although in other embodiments, the processor configured to perform super resolution processing on the captured video may be located remote to the video recording device, as embodiments of the invention are not limited in this respect. For example, in some embodiments, the processor may be incorporated in a display device capable of displaying high-resolution images, such as an HDTV, and the video recording device may transmit the low-resolution frames of the video sequence to the processor in the display device, which in turn reconstructs a high-resolution video sequence in accordance with some embodiments of the invention described herein.

Prior to transmitting the video to a processor, the video may be stored in one or more storage devices to enable the video to be processed at a later time. In some embodiments, the captured video may be processed in real-time to reconstruct high-resolution frames during recording of the low-resolution frames, and embodiments are not limited based on whether the super resolution processing is performed during recording of the video, or as a post-processing video enhancement process.

After the video is transmitted to a processor in act 220, the process proceeds to act 230, where one or more high-resolution frames are reconstructed from the low-resolution frames in the recorded video sequence. In some embodiments, multiple high-resolution frames are created by successively applying techniques as described herein to reconstruct a high-resolution video sequence from a plurality of low-resolution frames. After reconstructing the high-resolution frame(s) in act 230, the process proceeds to act 240, where the one or more high-resolution frames are output to a display device configured to display the reconstructed high-resolution frames. As should be appreciated from the foregoing, in some embodiments, the reconstruction of the high resolution frames may be performed by one or more processors located in the video recording device, display device, or located in any other local or remote location and embodiments of the invention are not limited in this respect.

Figure 5:
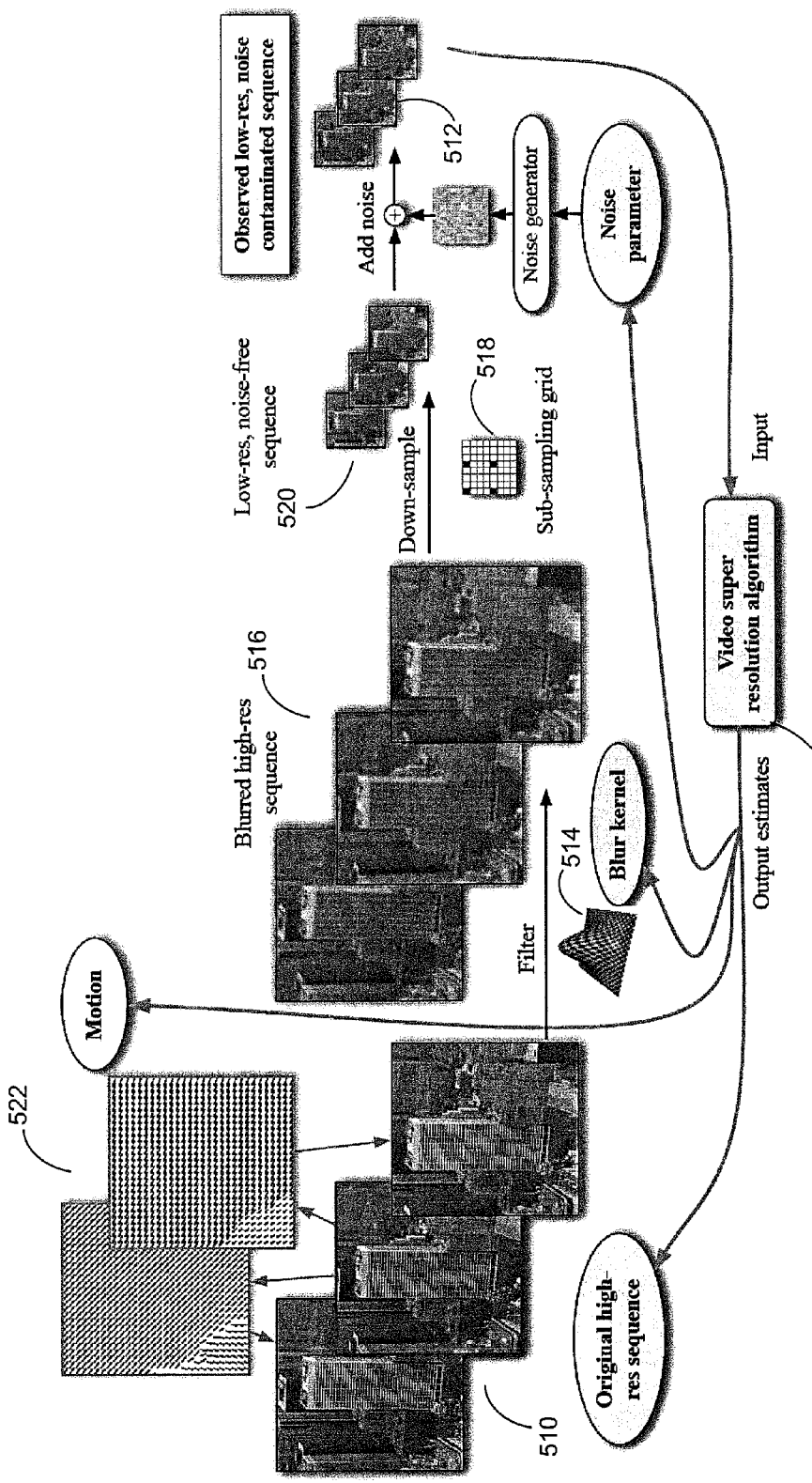
FIG. 5 is a schematic of a super resolution process in accordance with some embodiments of the invention.

The reconstruction of a high-resolution frame from a set of low-resolution frames may be accomplished in some embodiments by using a generative model for adaptive super resolution. Reconstruction of a high-resolution frame using super resolution may be thought of generally as an inversion problem in which an image formation model is run backwards. This process is depicted in FIG. 5, which is discussed in more detail below. Accordingly, to better understand how a generative model for super resolution may operate, it may be instructive to describe the reverse transformation of generating a set of low-resolution frames given an input set of high-resolution frames.

Figure 3:
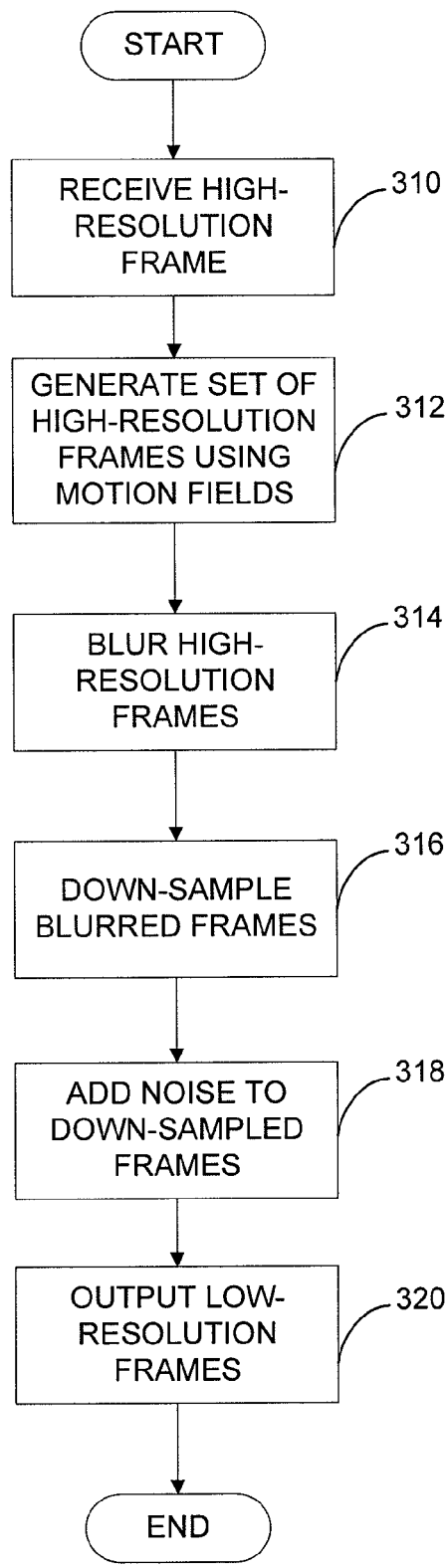
FIG. 3 is a flow chart of an underlying physical process of generating low-resolution frames from high-resolution frames in a digital camera in accordance with some embodiments of the invention.

FIG. 3 illustrates an exemplary process for generating a set of low-resolution frames {J} given a high-resolution frame I. In act 310, the high-resolution frame I is received. Then in act 312, the high-resolution frame I is deformed to a set of adjacent high-resolution frames {I}, based on a plurality of flow fields, which correspond to the motion of objects in the high-resolution frame I. Any suitable flow fields in the same dimension as the high-resolution frame I may be used and embodiments of the invention are not limited in this respect.

After generating a set of high-resolution frames, the process then proceeds to act 314, where each of the high-resolution frames is blurred using a blur kernel which acts as a smoothing filter to produce a set of high-resolution blurred frames. The process then proceeds to act 316, where the high-resolution blurred frames are down-sampled to create low-resolution blurred frames. Any suitable sub-sampling grid may be used for down sampling. For example, the high-resolution blurred frames may be down-sampled by a factor of 2 or 4.

The process then proceeds to act 318, where noise is added to the low-resolution blurred frames to create low-resolution blurred frames that are contaminated with noise. Any suitable noise level may be used for adding noise to the low-resolution blurred frames. As described in more detail below, different blur kernels and noise levels may also be used to generate different "observed" low-resolution blurred frames for comparisons of super resolution methods described herein with conventional super resolution techniques. After generating the low-resolution blurred frames with noise, the process proceeds to act 320, where the "observed" low-resolution frames are output.

Figure 4:
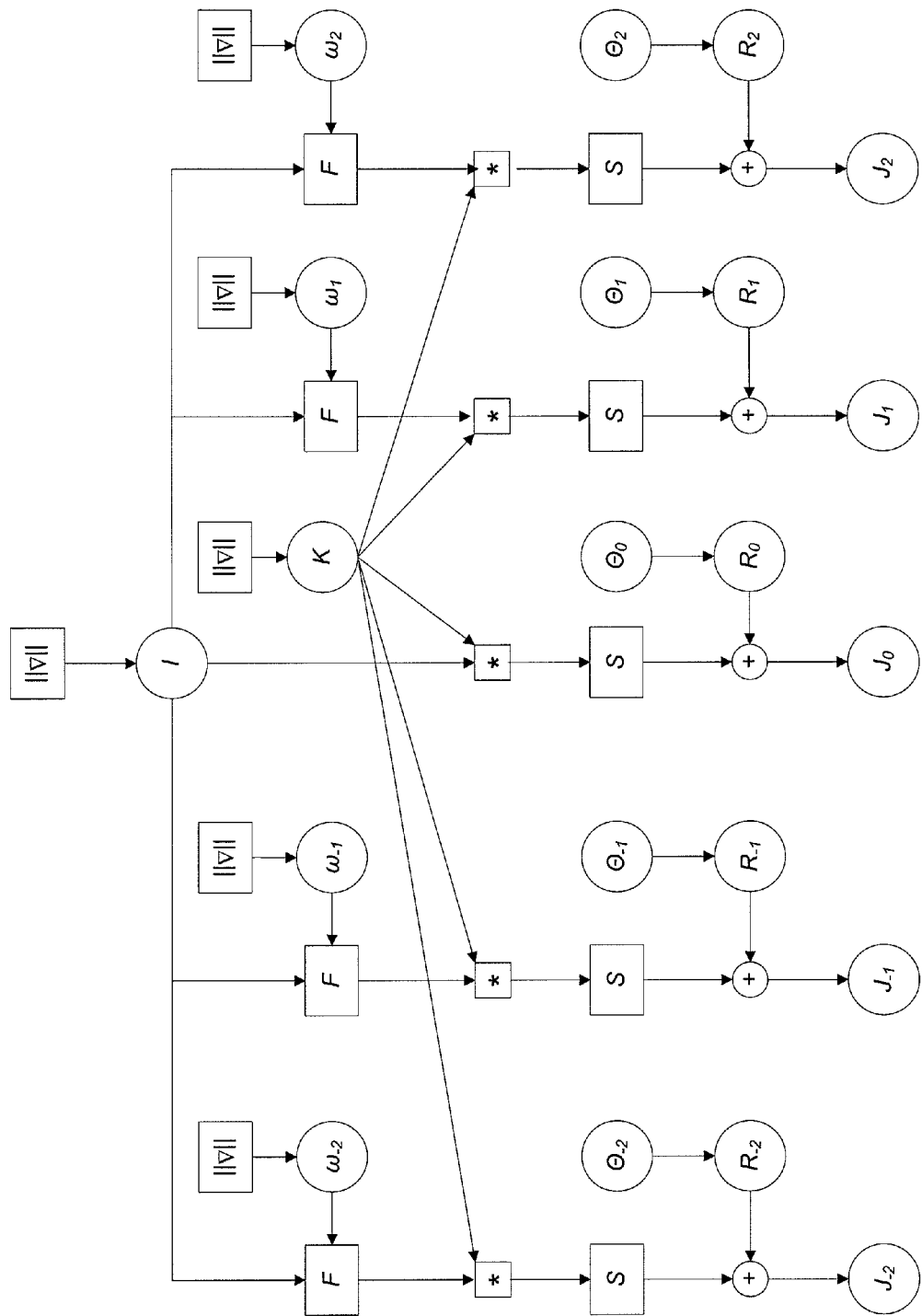
FIG. 4 is a graphical model relating a plurality of quantities used in a super resolution process in accordance with some embodiments of the invention.

The process described in FIG. 3 for generating a sequence of low-resolution frames from a plurality of high-resolution frames may be illustrated using a graphical model. FIG. 4 illustrates such an exemplary graphical model in accordance with some embodiments of the invention. The circular nodes represent variables, whereas the rectangular nodes represent matrices. The end of the directional edges indicates a constraint after transformation in the model. The priors $\eta$, $\lambda$, $\xi$, $\alpha$ and $\beta$ on I, $w_i$, K, and $\theta_i$ are not shown in FIG. 4 for brevity. Rather, all of the priors are described by the same symbol, $\|\nabla\|$.

Although the graphical model illustrated in FIG. 4 is explained in further detail below with regard to generating a low-resolution sequence of frames $\{J_{-N}, \ldots, J_N\}$ from a given high-resolution frame I, in practice, it should be appreciated that super resolution methods and apparatus in accordance with embodiments of the invention receive as input a set of low-resolution frames and outputs one or more corresponding high-resolution frames as described above with regard to FIG. 1.

At a time i=0, high-resolution frame I is smoothed with blur kernel K and down-sampled using down-sampling matrix S. The blur kernel K may be implemented, for example, as weighted matrix of pixel values in a neighborhood and the blur kernel may act as a blur filter by passing the weighted matrix over each pixel in the high-resolution frame to generate a high-resolution blurred frame. The high-resolution blurred frame may be down-sampled by any suitable factor (e.g., 2, 3, 4, etc.) onto a low-resolution lattice using known techniques or in any other suitable way. Noise is then added to the blurred frame to generate the "observed" noisy low-resolution frame $J_0$. Noise may be added using known techniques or in any other suitable way.

At times other that time i=0 (i.e., times i=-N, ..., N, i≠0), high-resolution frame I is warped according to a flow field $w_i$ to generate warped frame $F_i$. The flow field $w_i$ describes pixel motion between adjacent frames in a sequence of frames and may be implemented using known techniques or in any other suitable way. The warped frame $F_i$ is then smoothed by blur kernel K and downsampled using down-sampling matrix S to generate low-resolution blurred frames, and noise is added to generate low-resolution frames $J_i$ with $R_i$ that models both noise and outlier. Because the motion correspondence between two frames may not be perfectly explained using a motion algorithm such as optical flow, outliers are modeled to account for this discrepancy. The unknown parameters in the generative model shown in FIG. 4 include the blur kernel K, which corresponds to point spread functions in the imaging process or a smoothing filter when the high-resolution frames are down-sampled, $\theta_i$ that controls the noise and outlier $R_i$, $w_i$, according to which the high-resolution frame I is warped to generate the adjacent frames, and the high-resolution frame I.

As discussed above, some embodiments are directed to reconstructing a high-resolution frame within a Bayesian framework in which maximum a posteriori (MAP) estimation is used to infer each of the quantities of high-resolution frame, flow field, blur kernel, and noise level. In Bayesian statistics, an MAP estimate is used to find the mode of the posterior distribution, which is the product of a prior distribution and likelihood. A prior distribution (also called "prior," herein) of an uncertain quantity X is the probability distribution that would express one's uncertainty about X before observed data related to X is taken into account. In accordance with some embodiments of the invention, a super resolution process may be formulated as determining a solution to the optimization problem:

$$\{I^*, \{w_i\}^*, K^*, \{\theta_i\}^*\} = \underset{I,\{w_i\},K,\{\theta_i\}}{\operatorname{argmax}} p(I, \{w_i\}, K, \{\theta_i\} \mid \{J_i\}),$$

where the posterior is the product of a prior and a likelihood:

$$p(I, \{w_i\}, K, \{\theta_i\} \mid \{J_i\}) \propto$$

$$p(I)p(K) \prod_i p(w_i) \prod_i p(\theta_i) \cdot p(J_0 \mid I, K, \theta_0) \prod_{i \neq 0} p(J_i \mid I, K, w_i, \theta_i).$$

Conventional super resolution techniques for jointly estimating a high-resolution frame, flow field, and noise in a probabilistic framework typically assume that the blur kernel is known and use Gaussian priors for estimating both the high-resolution frame and the flow fields to simplify the calculations. However, the inventor has recognized and appreciated that Gaussian priors tend to over-smooth sharp boundaries during high-resolution frame reconstruction and motion estimation. Accordingly, some embodiments of the invention employ sparse priors to at least partially alleviate the over-smoothing effects that result when Gaussian priors are used.

Exemplary sparse priors for the high-resolution frame I, optical flow field $w_i$, and blur kernel K in accordance with some embodiments of the invention may take the form:

$$p(I) = \frac{1}{Z_I(\eta)} \exp\{-\eta \|\nabla I\|\},$$

$$p(w_i) = \frac{1}{Z_w(\lambda)} \exp\{-\lambda(\|\nabla u_i\| + \|\nabla v_i\|)\},$$

$$p(K_x) = \frac{1}{Z_K(\xi)} \exp\{-\xi \|\nabla K_x\|\}$$

where $\nabla$ is the gradient operator and $$\|\nabla I\| = \sum_q \|\nabla I(q)\| = \sum_q |I_x(q)| + |I_y(q)|, \text{ where } I_x = \frac{\partial}{\partial x} I,$$

$$I_y = \frac{\partial}{\partial y} I.$$

Accordingly, each of the sparse priors may correspond to L1 norms. Similar notation and representation as L1 norms may be used for $u_i$ and $v_i$, which are the horizontal and vertical components of the flow field $w_i$. In some embodiments, for computational efficiency, it may be assumed that the blur kernel K is x- and y-separable: $K=K_x \otimes K_y$, where $K_y$ has the same probability density function (pdf) as $K_x$. In the above-described exemplary sparse priors, $Z_I(\eta)$, $Z_w(\lambda)$ and $Z_K(\xi)$ are normalization constants that only depend on $\eta$, $\lambda$ and $\xi$, respectively.

In some embodiments, noise and outliers may be accounted for by assuming an exponential distribution for the likelihood:

$$p(J_i \mid I, K, \theta_i) = \frac{1}{Z(\theta_i)} \exp\{-\theta_i \|J_i - SKF_{w_i}I\|\},$$

where parameter $\theta_i$ reflects the noise level of frame i and $Z(\theta_i) = (2\theta_i)^{-dim(I)}$. Matrices S and K correspond to down-sampling and filtering with blur kernel K, respectively. $F_{w_i}$ is the warping matrix corresponding to flow field $w_i$. Naturally, the conjugate prior for $\theta_i$ is a Gamma distribution $$p(\theta_i; \alpha, \beta) = \frac{\beta^\alpha}{\Gamma(\alpha)} \theta_i^{\alpha-1} \exp\{-\theta_i \beta\}.$$

Some embodiments of the invention use the probability density functions (pdfs) for both the priors and likelihood in an iterative process to determine the initial estimates and to refine the initial estimates for each of the high-resolution frame I, the blur kernel K, the noise level $\{\theta_i\}$, and the flow field $\{w_i\}$. In some embodiments, the iterative process is implemented using coordinate descent to iteratively solve a Bayesian MAP inference for each of these quantities when treated as random variables in a Bayesian framework. Note that in the generative model described above and illustrated in FIG. 4, there are only five free parameters: $\eta$, $\lambda$, $\xi$, $\alpha$ and $\beta$, which can be, for example, estimated and adjusted manually or learned from ground-truth data.

FIG. 5 illustrates an overview of a super resolution process in accordance with some embodiments of the invention. As described above, super resolution algorithm 500 may be used to accurately reconstruct a high resolution frame sequence 510 given a set of observed low-resolution noise-contaminated frames 512. The top half of FIG. 5 illustrates a process for generating a sequence of low-resolution frames 512 when a high-resolution frame deformed to a set of high-resolution frames 510 is known, as has been described above in connection with FIGS. 3 and 4. For example, given a set of high-resolution frames 510, a blur kernel 514 may be used as a smoothing filter to generate a blurred high resolution sequence 516 and a sub-sampling grid 518 may be used to down-sample the blurred frames to generate low-resolution noise free sequence 520. Noise may then be added to the low-resolution frames to generate the low-resolution, noise contaminated frames 512.

In practice however, the typical situation is that each of the high-resolution frames 510, the flow fields 522, the blur kernel 514, and noise level is not known. Rather, the super resolution algorithm 500 receives a set of low-resolution frames that have been recorded by an imaging device such as a digital camera, and estimates for high-resolution frames 510 are generated along with estimates for flow fields 522, blur kernel 514, and noise level in an inverse image model estimation procedure as mentioned above, and described in more detail below.

Figure 6:
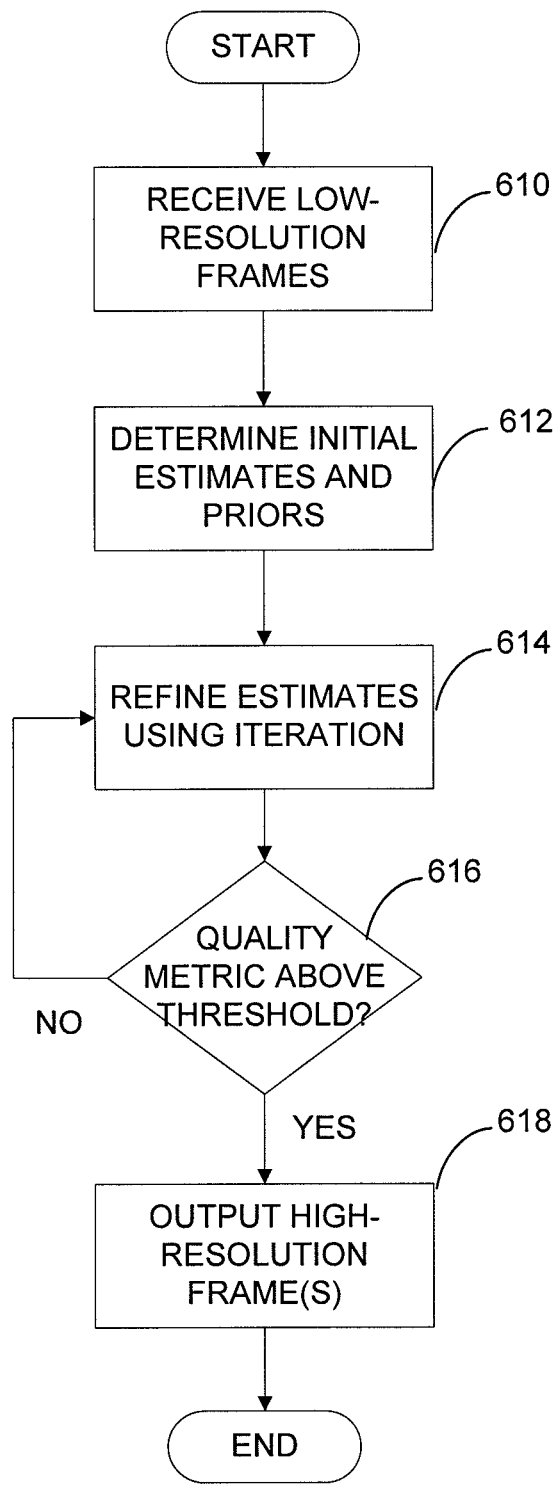
FIG. 6 is a flow chart of a super resolution process for generating a high-resolution frame from a plurality of low-resolution frames in accordance with some embodiments of the invention.

FIG. 6 illustrates an exemplary super resolution process in accordance with some embodiments of the invention. In act 610, a plurality of low-resolution frames of a video sequence are received by at least one processor configured to perform super resolution. For example, a mobile phone may record a video sequence comprising 1000 frames of low-resolution video. After recording the video, the recorded low-resolution frames may be transmitted to at least one processor to perform super resolution. The at least one processor may be located in the recording device or may be externally located. For example, the at least one processor may be included in a display device configured to display high-resolution frames output from a super resolution process.

Additionally, in some embodiments, at least some of the recorded low resolution frames may be transmitted to the at least one processor prior to capturing the entire video sequence. For example, recorded low-resolution frames may be buffered upon being recorded and at least some of the frames in the buffer may be sent to the at least one processor while the video sequence is still being recorded. By transmitting at least a portion of the low-resolution frames to the at least one processor prior to completing a video recording, the high-resolution frame(s) output by a super resolution process in accordance with some embodiments of the invention may be provided in real-time.

After the low-resolution frames are received by the at least one processor, the process proceeds to act 612, where initial estimates and priors are determined for the plurality of quantities described above including, blur kernel, noise level, motion (e.g., flow fields), and an estimate of high resolution frame. In some embodiments, an initial estimate for one or more of the plurality of quantities may be determined based, at least in part, on one or more stored values. Additionally, an initial estimate for one or more of the plurality of quantities may be determined based, at least in part, on the initial estimates generated for one or more of the other quantities. For example, the initial estimate for the high-resolution frame I may be determined based, at least in part, on initial estimates for the flow field $w_i$, the blur kernel K, and the noise level $\theta_i$, as discussed above. Any suitable priors may be used in accordance with embodiments of the invention. For example, some embodiments employ sparse priors which represent sparsity on derivative filter responses for each of the quantities described above.

After determining the initial estimates for the plurality of quantities, the process proceeds to act 614 where the initial estimates are refined using an iterative process. For example, the initial estimates may be refined within a Bayesian MAP framework using coordinate descent in which each of the quantities is solved for while the other quantities are held constant, as described above. A particular implementation of using coordinate descent within a Bayesian MAP framework is discussed in more detail below in connection with FIG. 7. It should be appreciated, however, that coordinate descent is only an exemplary optimization method for refining estimates and other optimization techniques may alternatively or additionally be used.

After at least one of the estimates has been refined, the process proceeds to act 616 where it is determined whether a quality metric is above a predetermined threshold. For example, in some embodiments, a quality metric may be defined as a probability that the super resolution process has located a local mode of the posterior distribution for one or more of the plurality of quantities, thereby signaling that no more iteration is required. Alternatively, the quality metric may compare a current estimate of one of the quantities with a stored threshold value to determine whether iteration should continue. If it is determined in act 616 that the quality metric is not above the threshold, the process returns to act 614, where one or more of the estimates is further refined. However, when it is determined in act 616 that the quality metric is above the threshold, the process proceeds to act 618, where the high-resolution frame(s) are output to a device including, but not limited to a display device and a storage device.

Figure 7:
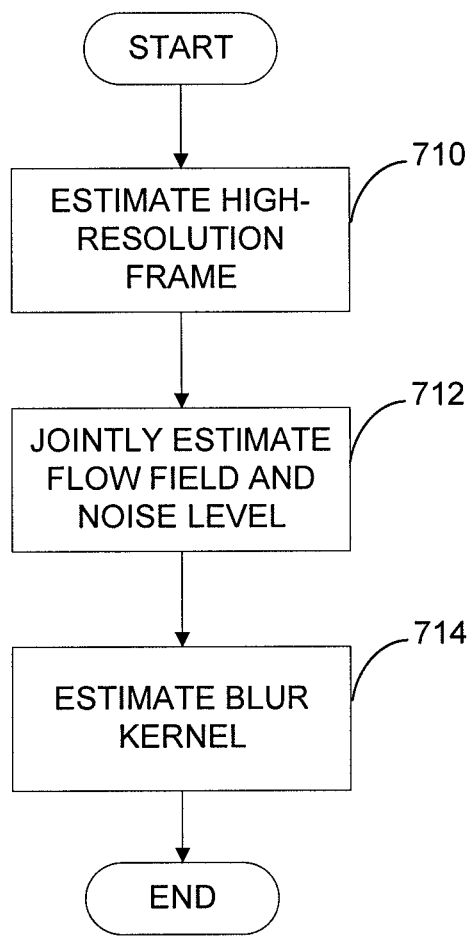
FIG. 7 is a flow chart of one iteration of an iterative process for refining estimates in a Bayesian generative model in accordance with some embodiments of the invention.

As described above, a coordinate descent process may be used to refine estimates in accordance with some embodiments of the invention. FIG. 7 illustrates one iteration of an exemplary iterative process for estimating each of the individual quantities above using coordinate descent in which one of the quantities is estimated while the other quantities are held constant. In act 710, an estimate of the high-resolution frame I may be solved based on the current estimates of the flow field $w_i$, the blur kernel K, and the noise level $\theta_i$ as follows:

$$I^* = \operatorname*{argmin}_{I} \theta_0 \|SKI - J_0\| + \eta \|\nabla I\| + \sum_{i=-N, i\neq 0}^{N} \theta_i \|SKF_{w_i} I - J_i\|.$$

To use gradient-based methods, the L1 norm may be replaced with a differentiable approximation $\phi(x^2) = \sqrt{x^2 + \epsilon^2}$ ($\epsilon = 0.001$) and denote $\Phi(|I|^2) = [\phi(I^2(q))]$.

This objective function may be solved in any suitable way including, but not limited to, using an iterated reweighted least squares (IRLS) method, which iteratively solves the following linear system:

$$\left[ \begin{array}{c} \theta_i K^T S^T W_0 SK + \eta (D_x^T W_s D_x + D_y^T W_s D_y) + \\ \sum_{i=-N, i\neq 0}^{N} \theta_i F_{w_i}^T K^T S^T W_i SKF_{w_i} \end{array} \right] I =$$

$$\theta_0 K^T S^T W_0 J_0 + \sum_{i=-N, i\neq 0}^{N} \theta_i F_{w_i}^T K^T S^T W_i J_i,$$

where the matrices $D_x$ and $D_y$ correspond to the x- and y-derivative filters. IRLS iterates between solving the above least square problem (through conjugate gradient) and estimating the diagonal weight matrices $W_0 = \operatorname{diag}(\Phi'(|SKI - J_0|^2))$, $W_s = \operatorname{diag}(\Phi'(|\nabla I|^2))$, and $W_i = \operatorname{diag}(\Phi'(|SKF_{w_i} I - J_i|^2))$ based on the current estimate.

After determining an estimate for the high-resolution frame, the process proceeds to act 712, where the flow field w, and the noise level $\theta_i$ may be jointly estimated based on the current estimates of the high-resolution frame/and the blur kernel K. In one implementation, the flow field $w_i$, and the noise level $\theta_i$ are estimated in a coarse-to-fine fashion on a Gaussian image pyramid. At each pyramid level the noise level and the flow field may be estimated iteratively. The Bayesian MAP inference for the noise parameter $\theta_i$ has the following closed-form solution:

$$\theta_i^* = \frac{\alpha + N_q - 1}{\beta + N_q \bar{x}}, \quad \bar{x} = \frac{1}{N_q} \sum_{q=1}^{N_q} |(J_i - SKF_{w_i} I)(q)|,$$

where $\bar{x}$ is sufficient statistics. After estimating the noise, a refined estimate of the flow field $w_i$ may be estimated as:

$$w_i^* = \operatorname*{argmin}_{w_i} \theta_i \|SKF_{w_i} I - J_i\| + \lambda \|\nabla u_i\| + \lambda \|\nabla v_i\|,$$

where the L1 norm |x| may again be approximated by $\phi(x^2)$. By first-order Taylor expansion, $F_{w_i + dw_i} I \approx F_{w_i} I + I_x du_i + I_y dv_i$, where $I_x=\text{diag}(F_{w_i}I_x)$ and $I_y=\text{diag}(F_{w_i}I_y)$, leads to the derivation:

$$\begin{bmatrix} I_x^T \tilde{W}_i I_x + \zeta_i L & I_x^T \tilde{W}_i I_y \\ I_y^T \tilde{W}_i I_x & I_y^T \tilde{W}_i I_y + \zeta_i L \end{bmatrix} \begin{bmatrix} du_i \\ dv_i \end{bmatrix} =$$

$$-\begin{bmatrix} \zeta_i L u_i \\ \zeta_i L v_i \end{bmatrix} - \begin{bmatrix} I_x^T \\ I_x^T \end{bmatrix} (\tilde{W}_i F_{w_i} I - K^T S^T W_i J),$$

where $$\zeta_i = \frac{\lambda}{\theta_i}, \tilde{W}_i = K^T S^T W_i S K,$$

and L is a weighted Laplacian matrix. The above equation may be solved in any suitable manner including, but not limited to, using IRLS to iteratively solve the equation, as described above.

The inventor has recognized and appreciated that it may be considerably more time consuming to solve the above equation than typical optical flow calculations due, at least in part, to the fact that for each iteration, smoothing, down-sampling, and all of the transposes are computed. To address this issue, in some embodiments, the flow field may first be estimated from $J_i$ to $J_0$ on the low-resolution lattice and the estimated flow field may be up-sampled to the high-resolution lattice as an initialization step for solving the above equation.

After refined estimates for the noise level and the flow field have been determined, the process proceeds to act 714 where a refined estimate for the blur kernel K is determined. Without loss of generality, only an estimation of the x-component of the blur kernel $K_x$ given I and $J_0$ is described herein. However, it should be appreciated that a similar estimation for the y-component of the blur kernel $K_y$ follows from the discussion below. In generating a refined estimate for $K_x$, each row of matrix A be considered as the concatenation of pixels corresponding to the blur kernel K, and the following relation may be defined: $M_y:M_y K_x = K_y \otimes K_x = K$.

Thus, the refined estimate for $K_x$ takes the form:

$$K_x^* = \underset{K_x}{\operatorname{argmin}} \theta_0 \|AM_y K_x - J\| + \xi \|\nabla K_x\|.$$

This objective function may be solved in any suitable manner including, but not limited to, using IRLS, as discussed above. By applying the spatial smoothness prior to the estimation of the blur kernel, the possibility that the blur kernel estimation converges to the delta function is considerably reduced. Experiments, described in more detail below, also demonstrate that the estimation methods described herein are able to recover the underlying blur kernel.

As described briefly above, the performance of super resolution methods and apparatus in accordance with some embodiments of the invention were tested in experiments to determine how well the system performed under unknown blur kernel and noise level conditions. The performance was then compared to conventional video super resolution methods using several real-world video sequences to demonstrate that the result of the super-resolution methods described herein provide superior performance in comparison to previous super resolution techniques that make at least some assumptions about the reconstruction.

In determining the performance of one embodiment of the invention, the benchmark sequence city, a portion of which is illustrated in FIG. 5, was used. Rich details at different scales make the city sequence ideal to observe how different frequency components are recovered during super resolution. The video recording process was simulated by first smoothing every frame of the original video with a Gaussian filter with standard deviation $\sigma_k$. The smoothed frames were down-sampled by a factor of 4, and white Gaussian noise with standard deviation $\sigma_n$ was added to the smoothed low-resolution frames. As the blur kernel $\sigma_k$ and the noise level $\sigma_n$ were varied for evaluation, the blur kernel $K_x$, $K_y$ was initialized with a standard normal distribution and the noise parameters $\theta_i$ were initialized using the temporal difference between frames. For experimentation, fifteen forward and fifteen backward adjacent frames were used to reconstruct an high-res image. However, it should be appreciated than any suitable number of frames may be used with embodiments of the super resolution methods and apparatus described herein.

First, the performance of the super resolution system described herein was analyzed under various noise levels. The blur kernel parameter $\sigma_k$ was fixed at 1.6 and the noise parameter $\sigma_n$ was varied between 0-0.5 to demonstrate increasing noise levels. When $\sigma_n=0$, quantization resulting from the physical nature of the sensor array is the only source of error in the image formation process. It was demonstrated that the system was able to produce fine details when the noise level is low ($\sigma_n=0.00, 0.01$), but also that the system was still able to recover major image structure even under a heavy noise condition ($\sigma_n=0.05$). These results suggest that the super resolution methods and apparatus described herein are robust to unknown noise levels.

Next, an embodiment of the present invention was tested to assess the performance under various blur kernels. In this experiment, the blur kernel parameter $\sigma_k$ was increased from 1.2 to 2.4 with step size 0.4 when generating the low-resolution frames to simulate image acquisition. The results of the experiment demonstrated that as $\sigma_k$ increases, fewer details are recovered in the high-resolution reconstructed image.

A comparison of an embodiments of the present invention with several conventional super resolution techniques was used to demonstrate the superior performance of the super resolution methods and apparatus described herein. Tables 1 and 2 summarize the comparisons between the an implementation of the super resolution method described herein ("Liu") and the conventional super-resolution methods.

Table 1 illustrates the peak signal to noise ratio (PSNR) values for each of the super resolution methods across four different benchmark video sequences, including the city video sequence described above. PSNR is commonly used as a metric to assess video quality and is a ratio between the maximum possible power of a signal and the power of corrupting noise that affects the fidelity of its representation.

As can be observed from Table 1, the implementation of an embodiment of the present invention ("Liu") exhibits higher PSNR values than any of the conventional super resolution techniques across all sequences, indicating the superior performance of embodiments of the present invention.

TABLE 1

| | PSNR score. | | | |
|---|---|---|---|---|
| | City | Calendar | Foliage | Walk |
| Liu | 27.100 | 21.921 | 25.888 | 24.664 |
| 3DKR | 24.672 | 19.360 | 24.887 | 22.109 |
| 3DKR-b | 24.363 | 18.836 | 24.376 | 21.938 |

TABLE 1-continued

| | PSNR score. | | | |
|---|---|---|---|---|
| | City | Calendar | Foliage | Walk |
| Enhancer | 24.619 | 19.115 | 24.476 | 22.303 |
| Shan et al. | 23.828 | 18.539 | 22.858 | 21.018 |
| Bicubic | 23.973 | 18.662 | 24.393 | 22.066 |

3DKR-b is the output of the 3DKR method before post processing

Table 2 illustrates the structural similar index method (SSIM) values for each of the super resolution methods across the same four benchmark video sequences described in Table 1. SSIM is also a commonly used metric for assessing video quality and is calculated on various windows of an image to evaluate the image quality.

As can be observed from Table 2, the implementation of an embodiment of the present invention ("Liu") exhibits higher SSIM values than any of the conventional super resolution techniques across all sequences, indicating the superior performance of embodiments of the present invention.

TABLE 2

| | SSIM score. | | | |
|---|---|---|---|---|
| | City | Calendar | Foliage | Walk |
| Liu | 0.842 | 0.803 | 0.845 | 0.786 |
| 3DKR | 0.647 | 0.600 | 0.819 | 0.584 |
| 3DKR-b | 0.637 | 0.554 | 0.797 | 0.554 |
| Enhancer | 0.677 | 0.587 | 0.803 | 0.604 |
| Shan et al. | 0.615 | 0.544 | 0.747 | 0.554 |
| Bicubic | 0.597 | 0.529 | 0.789 | 0.548 |

3DKR-b is the output of the 3DKR method before post processing.

Figure 8:
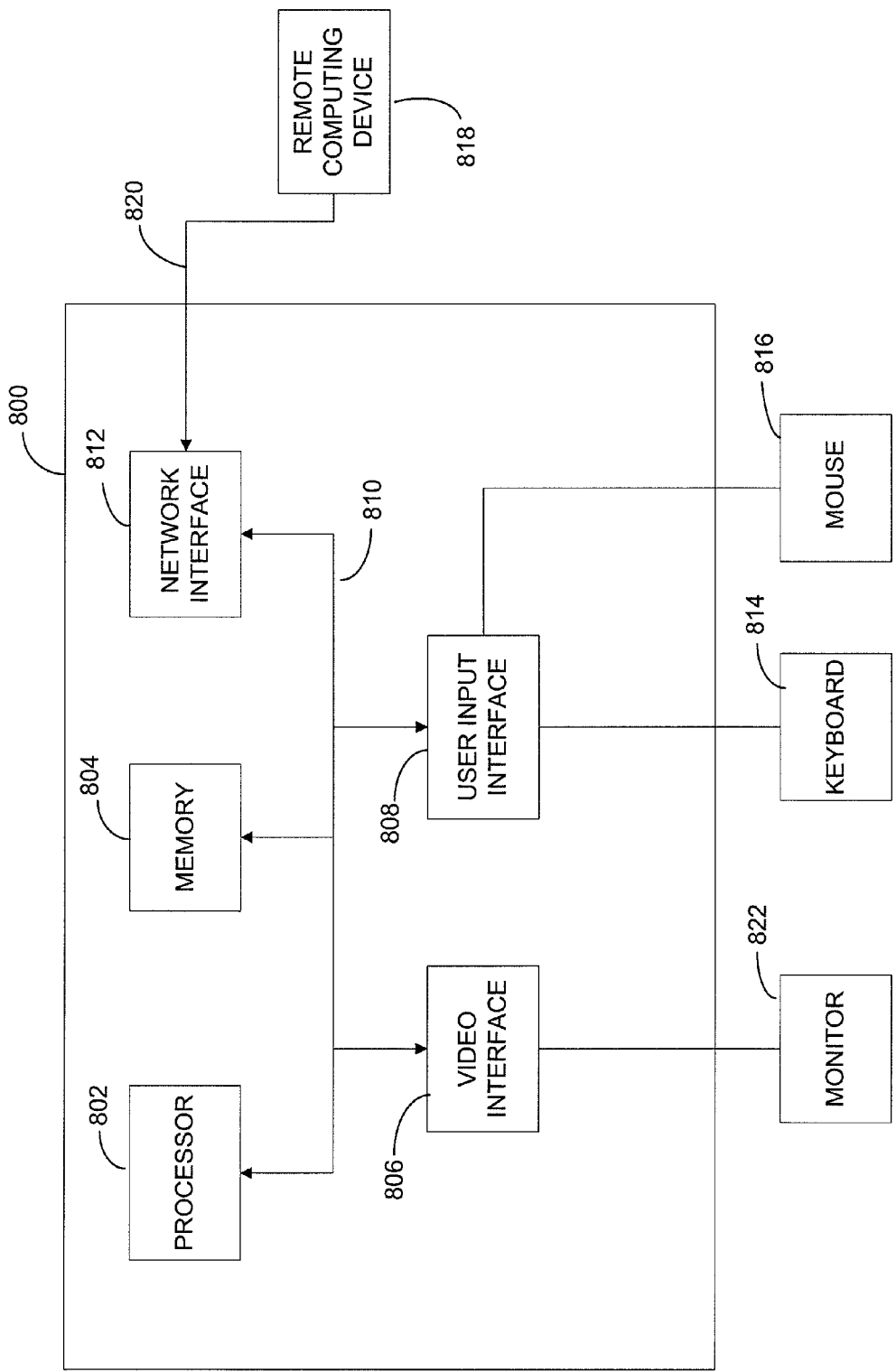
FIG. 8 is a block diagram of a computer system on which some embodiments of the invention may be implemented.

FIG. 8 shows a schematic block diagram of an illustrative computer 800 on which aspects of the invention may be implemented. Only illustrative portions of the computer 800 are identified for purposes of clarity and not to limit aspects of the invention in any way. For example, the computer 800 may include one or more additional volatile or non-volatile memories, one or more additional processors, any other user input devices, and any suitable software or other instructions that may be executed by the computer 800 so as to perform the function described herein.

In the illustrative embodiment, the computer 800 includes a system bus 810, to allow communication between a central processing unit 802, a memory 804, a video interface 806, a user input interface 808, and a network interface 812. The network interface 812 may be connected via network connection 820 to at least one remote computing device 818. Peripherals such as a monitor 822, a keyboard 814, and a mouse 816, in addition to other user input/output devices may also be included in the computer system, as the invention is not limited in this respect.

In some embodiments, one or more techniques for super resolution disclosed herein may be performed by one or more processors included in the same or different computer including, but not limited to computer 800. For example, the method illustrated in FIG. 6 for reconstructing a high-resolution frame from a plurality of low-resolution frames may be executed on a different processor than the method schematically illustrated in FIG. 7 for performing coordinate descent in a generative Bayesian framework. Additionally, in embodiments where multiple processors are used, the results of one method (e.g., refined estimate generation in FIG. 7) performed by a first processor may be transmitted to a second processor to perform a second method (e.g., high-resolution frame reconstruction in FIG. 6) using any suitable technique including, but not limited to, transmitting the results across a wired or wireless network, storing the results in a shared database, and physically transferring the results to a second computer on a tangible non-transitory computer-readable storage medium.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of generating a high-resolution frame from a plurality of adjacent low-resolution frames in a video sequence, the method comprising:
   generating, with at least one processor, initial estimates for a plurality of quantities including blur kernel, noise level, motion, and the high-resolution frame;
   refining the initial estimates for the plurality of quantities using an iterative process to generate refined estimates for the plurality of quantities including a refined estimate for the high-resolution frame, wherein the refined estimate for the high-resolution frame is based at least in part on estimates for the blur kernel, noise level, and motion, and the refined estimates for the motion and the noise level are based at least in part on estimates for the high-resolution frame and the blur kernel; and
   outputting the refined estimate for the high-resolution frame when it is determined that an estimate of the refined estimates has a quality metric above a threshold.

2. The method of claim 1, wherein the iterative process employs coordinate descent to generate the refined estimates for the plurality of quantities.

3. The method of claim 1, wherein the iterative process uses a Bayesian maximum a posteriori (MAP) framework that includes spare priors for at least some of the plurality of quantities.

4. The method of claim 3, wherein the sparse priors correspond to L1 norms.

5. The method of claim 1, wherein refining the initial estimates further comprises:
   generating a refined estimate for the blur kernel based, at least in part, on the estimate for the high-resolution frame and at least one of the low-resolution frames.

6. The method of claim 5, further comprising:
   generating the refined estimates for the motion and the noise level by jointly estimating the motion and the noise level in a coarse-to-fine fashion on a Gaussian image pyramid.

7. The method of claim 6, wherein generating the refined estimate for the motion comprises generating the refined estimate for the motion on a low-resolution lattice and up-sampling the estimated motion to a high-resolution lattice.

8. The method of claim 1, further comprising:
   refining at least some of the initial estimates using an iterated reweighted least squares (IRLS) process.

9. The method of claim 1, further comprising:
   receiving the plurality of adjacent low-resolution frames as a low-resolution video sequence; and
   rendering a high-resolution video output comprising a plurality of high-resolution frames, wherein each of the plurality of high-resolution frames is generated based on at least some of the frames in the low-resolution video sequence.

10. A computer-readable storage medium encoded with a plurality of instructions that, when executed by a computer, perform a method of generating a high-resolution frame from a plurality of adjacent low-resolution frames in a video sequence, the method comprising:

generating initial estimates for a plurality of quantities including blur kernel, noise level, motion, and the high-resolution frame;

refining the initial estimates for the plurality of quantities using an iterative process to generate refined estimates for the plurality of quantities including a refined estimate for the high-resolution frame, wherein the refined estimate for the high-resolution frame is based at least in part on estimates for the blur kernel, noise level, and motion, and the refined estimate for the noise level is based at least in part on estimates for the high-resolution frame and the blur kernel; and outputting the refined estimate for the high-resolution frame when it is determined that an estimate of the refined estimates has a quality metric above a threshold.

11. The computer-readable storage medium of claim 10, wherein iteratively estimating comprises using maximum a posteriori (MAP) estimation within the Bayesian framework that employs sparse priors corresponding to L1 norms.

12. The computer-readable storage medium of claim 10, wherein refining the initial estimates further comprises:

generating a refined estimate for the blur kernel based, at least in part, on the estimate for the high-resolution frame and at least one of the low-resolution frames.

13. The computer-readable storage medium of claim 10, wherein the method further comprises:

generating the refined estimates for the motion and the noise level by jointly estimating the motion and the noise level in a coarse-to-fine fashion on a Gaussian image pyramid;

wherein generating the refined estimate for the motion comprises generating the refined estimate for the motion on a low-resolution lattice and up-sampling the estimated motion to a high-resolution lattice.

14. The computer-readable storage medium of claim 10, wherein the method further comprises:

refining at least some of the initial estimates using an iterated reweighted least squares (IRLS) process.

15. The computer-readable storage medium of claim 10, wherein the method further comprises:

receiving the plurality of adjacent low-resolution frames as a low-resolution video sequence; and rendering a high-resolution video output comprising a plurality of high-resolution frames, wherein each of the plurality of high-resolution frames is generated based on at least some of the frames in the low-resolution video sequence.

16. A computer system, comprising:

at least one processor programmed to:

generate initial estimates for a plurality of quantities associated with a sequence of low-resolution frames of a video sequence, wherein the plurality of quantities includes a blur kernel, a noise level, a motion, and an estimate of a high-resolution frame;

refine the initial estimates for the plurality of quantities using an iterative process to generate refined estimates for the plurality of quantities including a refined estimate for the high-resolution frame, wherein the refined estimate for the high-resolution frame is based at least in part on estimates for the blur kernel, noise level, and motion, and the refined estimate for the motion is based at least in part on estimates for the high-resolution frame and the blur kernel; and output the refined estimate for the high-resolution frame when it is determined that an estimate of the refined estimates has a quality metric above a threshold.

17. The computer system of claim 16, wherein at least one processor is further programmed to refine the initial estimates by:

generating a refined estimate for the blur kernel based, at least in part, on the estimate for the high-resolution frame and at least one of the low-resolution frames.

18. The computer system of claim 16, wherein the at least one processor is further programmed to implement the iterative process within a Bayesian maximum a posteriori (MAP) framework.

19. The computer system of claim 18, wherein the iterative process employs sparse priors corresponding to L1 norms.

20. The computer system of claim 16, wherein each of the plurality of quantities is assumed to be an unknown random variable in a generative Bayesian framework.

* * * * *